United States Patent [19]

Szuminski

[11] Patent Number: 4,621,769
[45] Date of Patent: Nov. 11, 1986

[54] TURBOMACHINE EJECTOR NOZZLE

[75] Inventor: Gary F. Szuminski, Marietta, Ga.

[73] Assignee: Rolls-Royce Inc., New York, N.Y.

[21] Appl. No.: 410,984

[22] Filed: Aug. 24, 1982

[51] Int. Cl.[4] .............................................. F02K 1/12
[52] U.S. Cl. ........................... 239/265.39; 239/265.41
[58] Field of Search ................ 60/261, 262, 266, 271;
239/127.1, 127.3, 265.17, 265.33, 265.37, 265.39, 265.41

[56] References Cited

U.S. PATENT DOCUMENTS 2,974,480  3/1961  Kurti .............................. 239/265.39
4,043,509  8/1977  McHugh et al. ...................... 60/271

*Primary Examiner*—Stephen C. Bentley
*Attorney, Agent, or Firm*—Cushman, Darby & Cushman

[57] ABSTRACT

An ejector nozzle comprising an axially translatable member on which is mounted an axisymmetric array of first flaps 36 and hinged seal plates 39 which serve to define a variable area convergent nozzle. The first flaps have cam followers 38 that co-operate with cams 35 to determine the attitude of the first flaps 36. A plurality of second flaps 40 and second seal plates 43 are mounted on the first flaps. The upstream end of the second flaps 40 are spaced from the downstream ends of the first flaps 36 to form an air inlet. An axisymmetric array of third flaps 50 surround the first and second flaps 36,40. The third flaps 50 are pivotally connected at their downstream ends to the downstream ends of the second flaps 40, and are connected at their upstream ends to fixed structure 32,45,47 by pivotal links 49. A fixed ring 46 carrying rollers 51 surrounds the second flaps 40 at a region intermediate their upstream and downstream ends. The rollers 51 provide a fulcrum about which the second flaps 40 rock. Axial movement of the member 28 causes the first second and third flaps 36,40,50 to take up different positions and open up an air inlet that allows ambient air to mix with the hot gases flowing through the nozzle.

4 Claims, 3 Drawing Figures

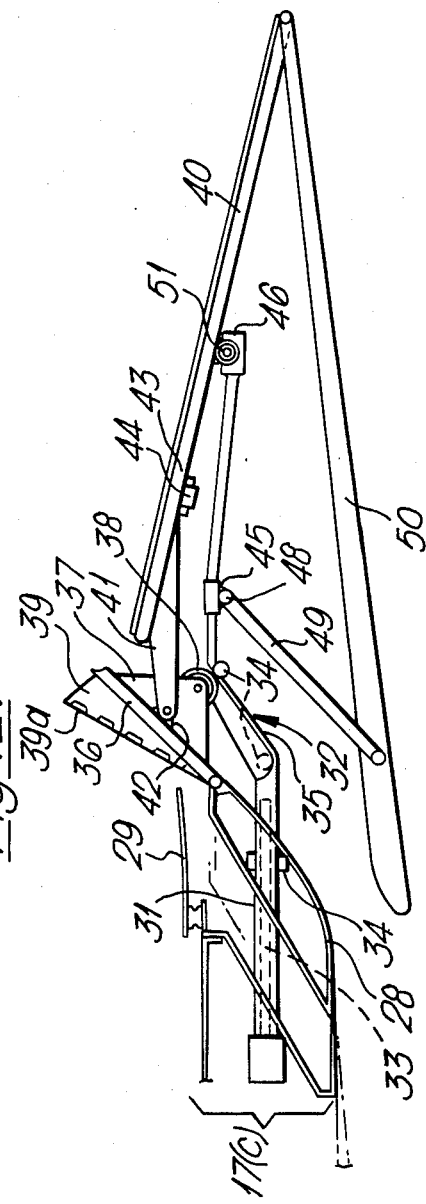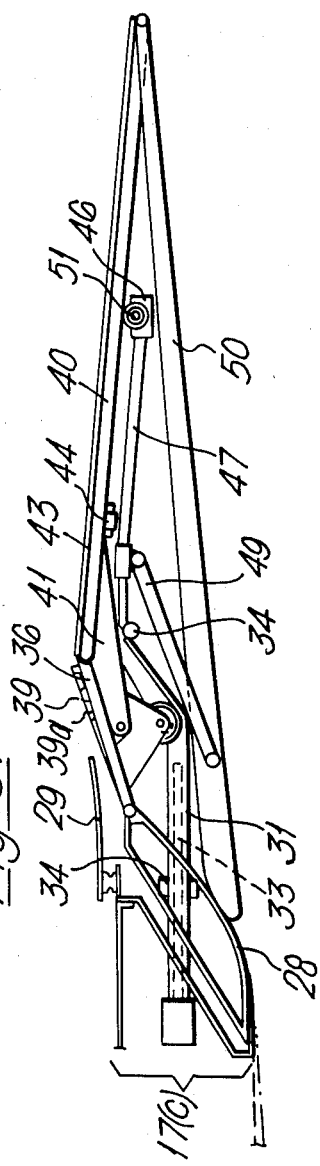

TURBOMACHINE EJECTOR NOZZLE

This invention relates to nozzles for gas turbine aero-engines and is particularly concerned with variable geometry nozzles and the suppression of the infra red radiation emitted by the hot exhaust plume of such engines.

Modern combat aircraft require the flexibility of being able to fly at subsonic or supersonic speeds and to perform a variety of roles. In some roles it is necessary to augment the basic thrust produced by the engine in the "dry" mode by burning additional fuel downstream of the engine's turbines, utilizing the unburnt oxygen in the exhaust gases to support combustion. This mode is known as reheat or afterburning. During reheat it is necessary to increase the area of the nozzle to accommodate the increased volume of gases so as not to impair the efficient functioning of the engine. In other roles such as supersonic cruise, it is desirable to vary the geometry of the exhaust nozzle of the engine from a convergent geometry for subsonic speed to a configuration having an increased area throat (compared to that required during the "dry" mode or at subsonic cruise) formed between a convergent and divergent part of the nozzle—often referred to as a con-di nozzle.

There are times during the flight envelope of an aircraft when reheat is not required and when the prime requisite is to reduce the infra red emission of the exhaust plume and thereby reduce or avoid detection by heat seeking missiles directed towards the aircraft. These missiles usually detect the infra red radiation of the hot exhaust gas plume and once the plume is located, home in on the hot parts of the engine to destroy the aircraft.

There is a need for a nozzle design that not only caters for dry and reheat modes of operation, but also enables one selectively to reduce the infrared emission of the engine.

An object of the present invention is to provide a variable geometry nozzle which is capable of use both in the dry and reheat modes of operation and also capable of reducing the infra red emission of the hot exhaust gas plume.

The invention as claimed enables one to vary the geometry of the nozzle to cope with dry and reheat modes of operation by moving the flaps and enables one to reduce the infra red emission by opening additional air inlets which admit ambient air to cool and shield the hot exhaust plume.

The nozzle of the present invention may be installed on a fixed jet pipe or on a vectorable jet pipe. Furthermore, the nozzle of the present invention may be installed on the vectorable front nozzles of an engine such as the Rolls-Royce Limited Pegasus engine which discharge cold or reheated by-pass air.

The invention will now be described, by way of an example, with reference to the accompanying drawings in which:

FIG. 2 illustrates in more detail a sectional elevation of part of the rear nozzle of the engine shown in FIG. 1, showing the nozzle in the "ejector mode", and, FIG. 3 shows the nozzle of FIG. 2 in the maximum area re-heat mode.

Figure 1:
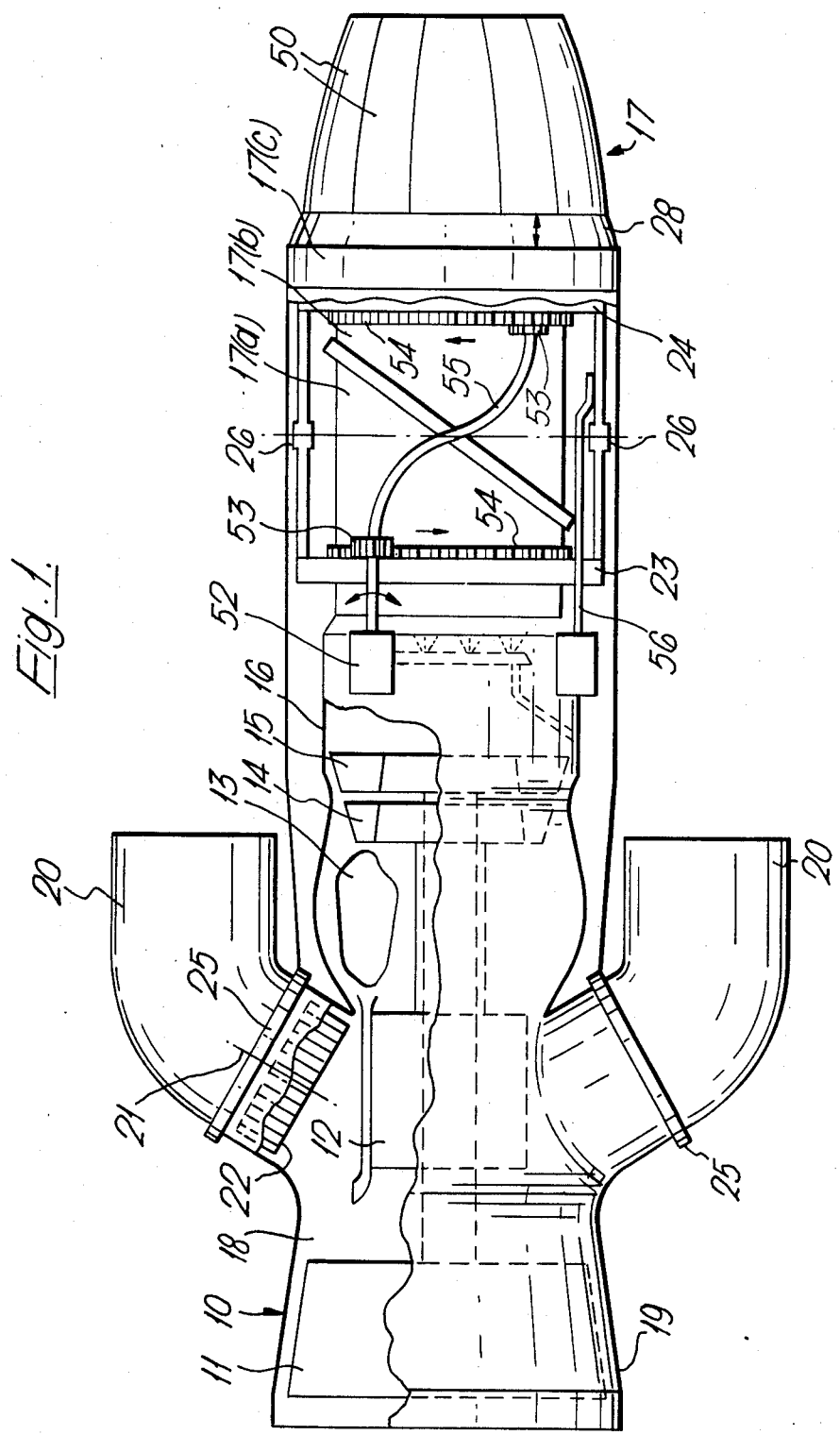
FIG. 1 illustrates schematically a gas turbine aero-engine incorporating three vectorable nozzles, the rear one of which is constructed in accordance with the present invention.

Referring to FIG. 1 there is shown schematically a gas turbine aero engine 10 of the by-pass type. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable variable area nozzle 17.

The L.P. compressor 11 supplies compressed air to the H.P. compressor 12 and to a plenum chamber 18 which forms part of the by-pass duct 19 and which terminates in two vectorable nozzles 20. The nozzles 20 are mounted in bearings 25 for rotation through an angle of approximately 110° about an axis 21.

Additional combustion equipment 22 is provided in the plenum chamber 18 so that additional fuel can be burnt in the air stream ejected through the nozzles 20 to increase the thrust. To enable the engine to run efficiently the nozzles 17 and 20 are provided with variable-area, variable-geometry outlets.

For convenience the invention will be more particularly described with reference to nozzle 17 but it is to be understood that the mechanism for varying the area and geometry may be similar for all the nozzles 17 and 20, and may also be used with nozzles for fixed jet pipes.

The nozzle 17 is of the type in which a scarfed rotatable duct 17(a) is mounted in bearings 23 on the downstream end of the jet pipe 16, and a second scarfed duct 17(b) is mounted in bearings 24 for rotation in the opposite direction to that of duct 17(a). The bearing 24 is, in turn, rotatable bodily on trunnions 26 which extend transverse to the axis of duct 17(b). This type of nozzle is described in more detail in co-pending U.S. Patent Application Ser. No. 376,388 entitled Vectorable Nozzles for Turbomachines naming Gary Frank Szuminski as the inventor. In operation, the bearing 24 is rotated about the axis of the trunnions 26 by means of a screw jack (shown schematically by the numeral 56) which pushes on the brackets that support the bearing 24 in the trunnions 26. As the bearing 24 is swung about the axis of the trunnions 26 the ducts 17(a) and 17(b) are rotated in opposite directions by means of a motor 52 and sprockets 53, chain drives 54 and flexible drive shaft 55 as explained in the above-mentioned U.S. patent application.

The nozzle 17 has at its downstream end a duct 17(c) which is carried by the fixed race of the bearing. It is this duct 17(c) that is provided with the mechanism for varying the geometry and area of the outlet of the nozzle 17 in accordance with the present invention, as shown in FIGS. 2 and 3.

Referring to FIGS. 2 and 3, the mechanism for varying the geometry and area of the outlet nozzle comprises an annular member 28 which is translatable axially and on which is carried three sets of flaps as will be described below. The member 28 is mounted to slide axially inside the downstream end duct 17(c) and the member 28 comprises an annular hollow box structure.

The member 28 slides inside the bore of the duct 17(c) and a heat shield liner 29 is provided to protect the duct 17(c) and the member 28 from the hot gases flowing through the nozzle when the reheat combustor 30 in the jet pipe is ignited.

The member 28 is supported on axially extending tubes 31 which carry an annular cam-ring assembly 32.

Located between the tubes 31 are lead screw 33 of a screwjack which engages a nut 34 (of the recirculating ball type) fixed to the member 28. Rotation of the lead screws 33 by a motor drive through gearboxes pushes and pulls the member 28 to and fro in the axial direction.

The cam ring assembly 32 comprises two polygonal frameworks of tubes 34 interconnected by which a plurality of cams 35 facing inwards (only one of which is shown). The cams 35 are equispaced around the axis of the duct 17(c).

A set of first primary flaps 36 is pivotally attached to the member 28. Each first primary flap 36 is pivotally attached at its upstream end to the downstream inner circumferential end of the member 28 and has a web 37 projecting from its outer facing side. The web 37 carries a cam follower 38, in the form of a roller, that engages one of the cams 35 to define and vary the attitude of the flaps 36 relative to member 28 as member 28 is moved in axial directions.

The flaps 36 comprise a hollow structure with spaced walls which are made from a carbon-carbon material such as Pyrocarb (Registered US Trade Mark) material as manufactured by Hitco of USA. Pyrocarb materials comprise a carbon matrix in which is embedded a woven cloth of carbon fibres. The material is projected from oxidation either by overcoating it with a non-oxidising protective layer or by impregnating silicon into it and converting the silicon to silicon carbide. Adjacent flaps 36 are interconnected by means of pairs of sealing plates 39 located between adjacent flaps 36. The sealing plates 39 are connected to the side edges of the flaps 36 by means of axially extending hinges. Each pair of plates 39 are also connected together by hinges 39(a) which extend axially. The hinged attachments of the plates 39 to the flaps 36 permit the flaps 36 to assume different diameters to vary the area of the nozzle formed by the flaps 36.

A second flap 40 is pivotally attached at its upstream end to each flap 36. Each flap 40 is a hollow structure of spaced carbon-carbon walls similar to flaps 36, and each flap 40 is provided with a flange 41 projecting forwards of the upstream end of the flaps 40. The flanges 41 are pivotally connected to lugs 42 on the outside surface of flaps 36 at a position intermediate the upstream and downstream ends of the flaps 36.

The second flaps 40 are spaced circumferentially and the gaps between them are closed-off by thin carbon-carbon seal plates 43. The upstream ends of the seal plates 43 are located on the inward-facing side of the flaps 40 and are constrained from falling inwards by rollers 44 which are mounted on flanges that project through the gaps between flaps 40 to engage the outer surface of the flaps 40. The seal plates 43 allow the flaps 40 to assume different positions where they define a divergent part of the nozzle by sliding relative to the flaps 40.

The cam ring assembly 32 also includes two fixed rings 45,46 located downstream of the cams 35. The fixed rings are connected back to the fixed structure of the cam ring assembly 32 by struts 47. The fixed ring 45 has spaced around its outer diameter a number of lugs 48 on each of which is mounted a pivotal link 49.

A set of third flaps 50 made of a carbon fibre reinforced polyimide material are pivotally mounted at an upstream end on the links 49. Each of the flaps 50 is pivotally attached at its downstream end to the downstream end of one of the second flaps 40. The flaps 50 overlap each other to accommodate different positions of the flaps 50 and form a seal therebetween.

The fixed ring 46 is located at a position intermediate the upstream and downstream ends of the flaps 40 and is provided with circumferentially spaced rollers 51 each of which is arranged with its axis of rotation tangential to the circumference of the ring 46. Each roller 51 engages the outside surface of one of the flaps 40 and allows the flaps to move in axial directions relative to the ring 46.

In operation of the nozzle, with the member 28 moved rearwards to the fully rearwards position (shown in FIG. 2), the cams 35 and cam followers 38 push the flaps 36 inwards to define a convergent throat. Simultaneously the flaps 40 are moved bodily rearwards and, because they are pivotally connected at their downstream ends to the flaps 50, they pull the flaps 50 rearwards. This in turn compresses the links 49 and, because they are constrained by the ring 46, the outer ends of the links 49 push the upstream end of the flaps 50 outwards to open up an air intake. Ambient air flows into the intake and exits into the hot gas flowing through the nozzle through the gap between the downstream ends of the flaps 36 and sealing plates 39 and the upstream ends of the flaps 40 and seal plates 43.

Axial movement of the flaps 36,40 and 50 causes the flaps 40 to rock about the fulcrum provided by the rollers 51 to define the proper divergent exit area of the nozzle downstream of the throat defined by the flaps 36.

The colder ambient air mixes with the hot turbine exhaust gases to cool the plume and reduce the infra red emissions thereof.

Pulling the member 28 forwards to the position shown in FIG. 3 causes the cam follower 38 to follow the cam 35 and pulls the flaps 36 outwards to define a maximum area throat as would be required during the reheat mode. The length of flange 41 is chosen so that in this position of flap 36 the upstream edges of the flaps 40 and seal plates 43 seal against the downstream ends of flaps 36 and seal plates 39. Forward movement of the flaps 40 pulls the flaps 50 forwards and simultaneously closes off the air intake.

Clearly, at intermediate positions between those shown in FIGS. 2 and 3 various combinations of convergence and divergence with different throat areas can be obtained.

I claim:

1. An exhaust nozzle for a gas turbine comprising a duct extending along an axis and having, at a downstream end thereof, a mechanism for varying the geometry and area of the nozzle, the mechanism comprising: a translatable member movable in a direction along the length of the duct; a plurality of first flaps spaced circumferentially around the axis of the duct each first flap being pivotally attached at its upstream end to the member and being provided with a cam follower that cooperates with a cam that is fixed relative to the duct thereby to define the attitude of each first flap relative to the duct; a plurality of first seal plates interposed circumferentially between the first flaps to close off the circumferential gap between juxtaposed first flaps; a plurality of circumferentially spaced second flaps located downstream of the first flaps, each second flap being pivotally attached at its upstream end to a first flap by means which, at least in one position of the first flaps, defines an air inlet opening between the downstream end of each first flap and the upstream end of each second flap; a plurality of second seal plates interposed circumferentially between the second flaps to close off the circumferential gap between juxtaposed second flaps; a plurality of third flaps each of which is pivotally attached at its downstream end to a downstream end of one of the second flaps; a plurality of links, each of which is pivotally attached at one end to an upstream region of a third flap and pivotally attached at its other end to structure which is fixed relative to the duct; a ring which is fixed relative to the duct and encircles the second flaps at a region intermediate the upstream and downstream ends of the second flaps; and a constraining means which co-operates with the fixed ring to provide a fulcrum about which each second flap rocks to assume various attitudes relative to the duct.

2. An exhaust nozzle according to claim 1 wherein pairs of first seal plates are interposed between juxtaposed first flaps, the seal plates are pivotally connected to each other along a first side edge and are pivotally connected to the first flaps along a second side edge.

3. An exhaust nozzle according to claim 1 or claim 2 wherein the second seal plates are provided with a roller means which contacts the outward facing sides of the second flaps and the second seal plates are pivotally attached at their downstream ends to the downstream ends of the third flaps.

4. An exhaust nozzle according to claim 1 or claim 2 wherein the constraining means comprises a plurality of circumferentially spaced rollers mounted on the ring, each roller being positioned to co-operate with one of the second flaps and arranged with its axis of rotation tangential to a circumference of the ring.

* * * * *